United States Patent Office 3,472,838
Patented Oct. 14, 1969

3,472,838
9 - (β - D - ARABINOFURANOSYL) - 6 - (AMIDINO) PURINE COMPOUNDS AND METHODS FOR THEIR PRODUCTION
Stephen Hanessian, Ann Arbor, Mich., assignor to Parke, Davis & Company, Detroit, Mich., a corporation of Michigan
No Drawing. Filed Dec. 1, 1967, Ser. No. 687,107
Int. Cl. A61l 13/00; A61k 27/00
U.S. Cl. 260—211.5  4 Claims

ABSTRACT OF THE DISCLOSURE 6-amidino derivatives of 9-(β-D-arabinofuranosyl) purine, in which the amidino group is an aliphatic acyclic group, such as dialkylformamidino or dialkylacetamidino, or a 5-, 6-, or 7-membered heterocyclic group, such as 1-methyl-2-pyrrolidinylideneamino, and their production by reacting 9-(β-D-arabinofuranosyl)adenine with an amide acetal. The compounds are useful as antiviral agents per se, or, because of their ready solubility in aqueous media and hydrolysis under moderately acidic or basic conditions, as agents for supplying increased amounts of the relatively insoluble 9-(β-D-arabinofuranosyl)adenine.

SUMMARY AND DETAILED DESCRIPTION

The present invention relates to new amidine compounds that are useful pharmacological agents and to methods for their production. More particularly, the invention relates to new 9 - (β - D - arabinofuranosyl) - 6-(amidino)purine compounds that are represented by the formula

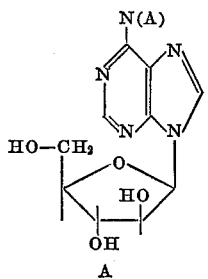

A where A represents a group having the formula

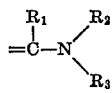

or a group having the formula

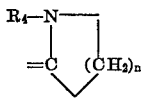

where $R_1$ is hydrogen or methyl; each of $R_2$, $R_3$, and $R_4$ is methyl or ethyl; and $n$ is 1, 2, or 3.

In accordance with the invention, compounds having the foregoing formula are produced by reacting 9-(β-D-arabinofuranosyl)adenine with an amide acetal compound having the formula

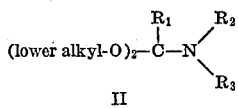

II or with a cyclic amide acetal compound having the formula

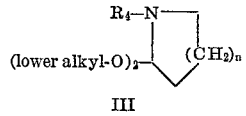

III where $R_1$, $R_2$, $R_3$, $R_4$, and $n$ have the aforementioned significance. The reaction is advantageously carried out in an unreactive solvent medium, which is chosen in such a way so as to insure a homogeneous reaction mixture. While any of a number of solvents may suitably be employed, the most desirable solvents are tertiary amides, including N,N-dimethylformamide, N,N-dimethylacetamide, N-methyl-2-pyrrolidinone, N-methyl-2-piperidone, and hexahydro-1-methyl-2H-azepin-2-one. Of these, the preferred solvent in an individual reaction is the tertiary amide from which the amide acetal that is used in that reaction is derived. The reactants may be employed in equimolar amounts; it is preferable, however, in order to insure complete reaction, to use a moderate to large excess of the amide acetal reactant. The temperature and duration of the reaction are not especially critical and may be varied over a wide range. The temperature may be varied between 0 and 80° C., with a temperature in the range of 20 to 25° C. being preferred. The duration of the reaction may be varied from about 15 minutes to about 24 hours. At the preferred temperature the reaction is normally complete after a period that may vary from about 15 minutes to about 3 hours. When the reaction is carried out employing an amide acetal other than an N,N-dialkylformamide dialkyl acetal, it is desirable to avoid exposure of the reaction mixture to light for any extensive period because the higher acetals, such as N,N-dimethylacetamide dimethyl acetal and N-methyl-2-pyrrolidinone diethyl acetal, are subject to decomposition upon extended exposure to light.

The amide acetal compounds required as starting materials in the foregoing process can be prepared by any of a variety of methods. This general class of compounds and a number of individual members of the class have been reported in Angewandte Chemie, vol. 72, page 838 (1960). Other such compounds that have not been reported previously can be prepared as described in greater detail hereinafter or according to one of the methods described in this publication.

The compounds of the invention are new chemical compounds that are useful as pharmacological agents, especially an antiviral agents. As such, they have been found to be active against both herpes and vaccinia viruses.

Their activity as antiviral agents can be quantitatively measured in an in vitro test by utilizing the plaque reduction technique first developed by Dulbecco [Proc. Natl. Acad. Sci., vol. 38, pages 747–752 (1952)], and modified by Hsiung and Melnick [Virology, vol. 1, pages 533–535 (1955)]. In this test, a complete cell monolayer is first grown on a glass test unit. The growth medium is then removed and the virus is adsorbed on the cell monolayer for a measured time period. In the absence of an antiviral agent, the virus will destroy well-defined areas of cells, called plaques, that can be seen macroscopically when the vital stain, neutral red, is added to the system. To test the inhibiting effect of a given compound, the test compound in solution is added to the virus-cell system, and the whole is covered with a nutrient agar overlay containing neutral red. After incubation, the plaques are counted, and the number of plaques produced in the system containing the test compound is compared with the number produced in the control systems, from which only the test compound is omitted. The inhibitory activity of a test compound is reported as the percentage reduction of the plaque count on the test units compared with that on the controls.

When tested by this plaque reduction technique, with 4-oz. glass bottles serving as the test units and H. Ep. #2 cells making up the cell monolayer, the preferred compound of the invention, N'-(9β-D-arabinofuranosyl-9H-purin-6-yl)-N,N-dimethylformamidine, at a concentration of 31.2 micrograms/ml. in Hanks' balanced salt solution (pH 7–8), was found to give a 95% and an 87% plaque reduction against herpes simplex and vaccinia viruses, respectively.

As can be seen from the general Formula I, the compounds of the invention are structurally related to 9-(β-D-arabinofuranosyl)adenine, which is known to be an antiviral agent that is active primarily against herpes and vaccinia viruses. While structurally related. the compounds of the present invention offer an advantage in use over 9(β-D-arabinofuranosyl)adenine by virtue of their greater solubility in aqueous media. For example, whereas the solubility of 9-(β-D-arabinofuranosyl)adenine in water is less than 1 mg./ml., the corresponding solubility of N'-(9-β-D-arabinofuranosyl-9H-purin - 6 - yl) - N,N-dimethylformamidine is greater than 40 mg./ml. This enhanced aqueous solubility of the compounds of the present invention is an important advantage in their formulation and administration. Furthermore, it has been found that the present compounds can be hydrolyzed under moderately acidic or moderately basic conditions to give 9-(β-D-arabinofuranosyl)adenine as one of the products. Thus, because of their ready water solubility, they can be used in solution in aqueous media to supply 9-(β-D-arabinofuranosyl)adenine in a sustained fashion by control of hydrolysis conditions.

The invention is illustrated by the following examples.

Example 1

To a stirred suspension of 1.5 g. of 9-(β-D-arabinofuranosyl)adenine in 30 ml. of anhydrous N,N-dimethylformamide is added 15 ml. of N,N-dimethylformamide dimethyl acetal, the mixture is stirred at room temperature for about 16 hours, and the resulting solution is added dropwise to 1000 ml. of ether. The crystalline precipitate, which is N'-(9-β-D-arabinofuranosyl-9H-purin-6-yl)-N,N-dimethylformamidine, is isolated by filtration, washed well with ether, and purified by crystallization from a mixture of dichloromethane, methanol, and ether; M.P. 214–215° C., with decomposition after gradual darkening above 200° C. This product is soluble at 25° C. in distilled water and in 0.1 M phosphate buffer, pH 6.6, to the extent of at least 40 mg./ml.

In the foregoing procedure, with the substitution of 15 ml. of N,N-diethylformamide dimethyl acetal for the N,N-dimethylformamide diethyl acetal, there is obtained N' - (9 - β - D - arabinofuranosyl - 9H - purin - 6 - yl)-N,N-diethylformamidine.

Example 2

To a stirred suspension of 3.5 g. of 9-(β-D-arabinofuranosyl)adenine in 30 ml. of dry N,N-dimethylacetamide is added 30 ml. of N,N-dimethylacetamide dimethyl acetal, the mixture is stirred for 2 hours, and the resulting solution is kept in the dark at room temperature for 16 hours. The solution is then added dropwise to 2 liters of ether to precipitate N'(9-β-D-arabinofuranosyl-9H-purin-6-yl)-N,N-dimethyl acetamidine, which is isolated by filtration and purified as follows. The solid is dissolved in dichloromethane containing a small amount of methanol, the resulting solution is filtered, and the filtrate is added to a large excess of ether to precipitate the purified product, which is isolated by filtration and dried. The ultraviolet spectrum of this product in ethanol shows $\lambda_{max}$. 304, $E_1^1$ 523. The solubility at 25° C. in water is at least 100 mg./ml. and in 0.1 M phosphate buffer, pH 6.6, at least 210 mg./ml.

Example 3

To a stirred suspension of 5.0 g. of 9-(β-D-arabinofuranosyl)adenine in 100 ml. of N-methyl-2-pyrrolidinone is added 35 ml. of N-methyl-2-pyrrolidinone diethyl acetal, the mixture is stirred for 20 minutes, and the resulting solution is kept in the dark for 3 hours. It is then added dropwise to 2 liters of ether to precipitate 9-β-D-arabinofuranosyl-$N^6$-(1-methyl - 2 - pyrrolidinylidene)adenine, which is isolated by filtration, washed with ether, and dried; M.P. 178–180° C., with decomposition, following crystallization from a mixture of dichloromethane, methanol, and ether. The solubility in water at 25° C. is at least 100 mg./ml.

Example 4

Utilizing the procedure described in Example 3 above, the following amidine derivatives of 9-(β-D-arabinofuranosyl)adenine are produced from the reaction of the compounds indicated below.

(a) From the reaction of 5.0 g. of 9-(β-D-arabinofuranosyl)adenine and 40 ml. of hexahydro-1-methyl-2H-azepin-2-one diethyl acetal in 100 ml. of hexahydro-1-methyl-2H-azepin-2-one, there is obtained 9-β-D-arabinofuranosyl-$N^6$-(hexahydro-1-methyl - 2H - azepin - 2 - ylidene)adenine.

(b) From the reaction of 5.0 g. of 9-(β-D-arabinofuranosyl)adenine and 35 ml. of N-methyl-2-piperidone diethyl acetal in 100 ml. of N-methyl-2-piperidone, there is obtained 9-β-D-arabinofuranosyl-$N^6$-(1-methyl-2-piperidinylidene)adenine.

The amide acetal starting materials required for use in the foregoing reactions are prepared as follows.

(1) Hexahydro-1-methyl-2H-azepin-2-one diethyl acetal: To a stirred solution of 127 g. of hexahydro-1-methyl-2H-azepin-2-one in 1000 ml. of methylene chloride, cooled to —10° C., is added 190 g. of triethyloxonium tetrafluoroborate, and the resulting solution is stirred for 1 hour at room temperature, kept at 5° C. for 48 hours, and then cooled in a Dry Ice-acetone bath to precipitate solid 3,4,5,6-tetrahydro-7-ethoxy-1-methyl-2H-azepinium tetrafluoroborate. The supernatant liquid is decanted from the cooled mixture and discarded. The solid residue is first washed with dry ether and is then added in small portions to a stirred solution of 68 g. of sodium ethoxide in excess ethanol, cooled to —70° C. The sodium tetrafluoroborate that precipitates is removed by filtration and discarded, and the filtrate is fractionally distilled at reduced pressure to give the desired hexahydro-1-methyl-2H-azepin-2-one diethyl acetal, which is obtained as a pale yellow oil suitable for use without further purification.

(2) N-methyl-2-piperidone diethyl acetal: This starting material is obtained starting from N-methyl-2-piperidone in a manner analogous to that described above for the preparation of hexahydro-1-methyl-2H-azepin-2-one diethyl acetal. The N-methyl-2-piperidone diethyl acetal is isolated by distillation under reduced pressure as a colorless to pale yellow oil that is suitable for use without further purification.

I claim:

1. A 9-(β-D-arabinofuranosyl) - 6 - (amidino)purine compound having the formula

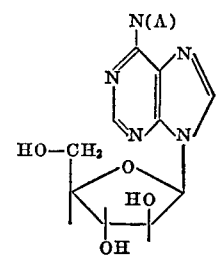

where A represents a member of the class consisting of a group having the formula

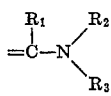

and a group having the formula

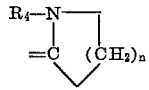

where $R_1$ is a member of the class consisting of hydrogen and methyl; each of $R_2$, $R_3$, and $R_4$ is a member of the class consisting of methyl and ethyl; and $n$ is a positive integer having a value chosen from among 1, 2, and 3.

2. A compound according to claim 1 which is N'-(9-β-D-arabinofuranosyl-9H-purin-6-yl)-N,N-dimethylformamidine.

3. A compound according to claim 1 which is N'-(9-β-D-arabinofuranosyl-9H-purin-6-yl)N,N-dimethylacetamidine.

4. A compound according to claim 1 which is 9-β-D-arabinofuranosyl-$N^6$-(1-methyl-2-pyrrolidinylidene)adenine.

References Cited

UNITED STATES PATENTS 3,225,029  12/1965  Yamaoka _____ 260—211.5

OTHER REFERENCES

Smrt et al.: "Collection Czechoslov. Chem. Commun.," vol. 32, 1967, pp. 3169–3176.

LEWIS GOTTS, Primary Examiner
JOHNNIE R. BROWN, Assistant Examiner

U.S. Cl. X.R.

260—999